(12) United States Patent
Kurdak et al.

(10) Patent No.: US 9,522,608 B2
(45) Date of Patent: Dec. 20, 2016

(54) MULTI-DIMENSIONAL BATTERY NETWORKS FOR LARGE SCALE ENERGY STORAGE AND ELECTRICAL VEHICLE APPLICATIONS

(71) Applicant: THE REGENTS OF THE UNIVERSITY OF MICHIGAN, Ann Arbor, MI (US)

(72) Inventors: Cagliyan Kurdak, Ann Arbor, MI (US); Myron Campbell, Ann Arbor, MI (US)

(73) Assignee: The Regents Of The University Of Michigan, Ann Arbor, MI (US)

( * ) Notice: Subject to any disclaimer, the term of this patent is extended or adjusted under 35 U.S.C. 154(b) by 0 days.

(21) Appl. No.: 14/207,814

(22) Filed: Mar. 13, 2014

(65) Prior Publication Data

US 2014/0266053 A1   Sep. 18, 2014

Related U.S. Application Data

(60) Provisional application No. 61/778,534, filed on Mar. 13, 2013.

(51) Int. Cl.
| | | |
|---|---|---|
| *H02J 7/00* | (2006.01) | |
| *B60L 11/18* | (2006.01) | |
| *B60L 3/00* | (2006.01) | |
| *H01M 10/0525* | (2010.01) | |
| *H01M 10/42* | (2006.01) | |

(52) U.S. Cl.
CPC .......... *B60L 11/1877* (2013.01); *B60L 3/0046* (2013.01); *B60L 11/1855* (2013.01); *H01M 10/0525* (2013.01); *H01M 10/4207* (2013.01); *Y02T 10/7005* (2013.01); *Y02T 10/705* (2013.01); *Y02T 10/7011* (2013.01)

(58) Field of Classification Search
CPC .... Y02E 60/12; G01R 31/3648; H01M 10/44; H02J 7/0031; H02J 7/0047
USPC ........................................................ 320/127
See application file for complete search history.

(56) References Cited

U.S. PATENT DOCUMENTS

| | | | |
|---|---|---|---|
| 5,180,641 A | 1/1993 | Burns et al. | |
| 6,014,013 A * | 1/2000 | Suppanz et al. ............. | 320/122 |
| 6,465,986 B1 | 10/2002 | Haba | |
| 6,882,129 B2 | 4/2005 | Boskovitch et al. | |
| 7,573,233 B1 | 8/2009 | Chow et al. | |
| 7,990,101 B2 | 8/2011 | Hoff et al. | |
| 2003/0134189 A1* | 7/2003 | Kanai ................... | H01M 2/105 429/156 |
| 2011/0003182 A1 | 1/2011 | Zhu | |
| 2013/0033793 A1* | 2/2013 | Takeda ........................ | 361/91.4 |

FOREIGN PATENT DOCUMENTS

WO   WO-2011049266 A1   4/2011

OTHER PUBLICATIONS

International Search Report, Application No. PCT/US2014/025761, dated Aug. 27, 2014, 6 pages.

* cited by examiner

*Primary Examiner* — Arun Williams
(74) *Attorney, Agent, or Firm* — Harness, Dickey & Pierce, PLC

(57) ABSTRACT

Multi-dimensional battery networks are presented that are intrinsically superior to the standard battery networks that are currently being used in electric vehicle applications. The higher dimensional battery networks are more stable against failures in individual batteries. The networks can be implemented using Li-ion batteries and enhance the lifetime of battery networks, which is critically important, for example in automotive applications.

6 Claims, 1 Drawing Sheet

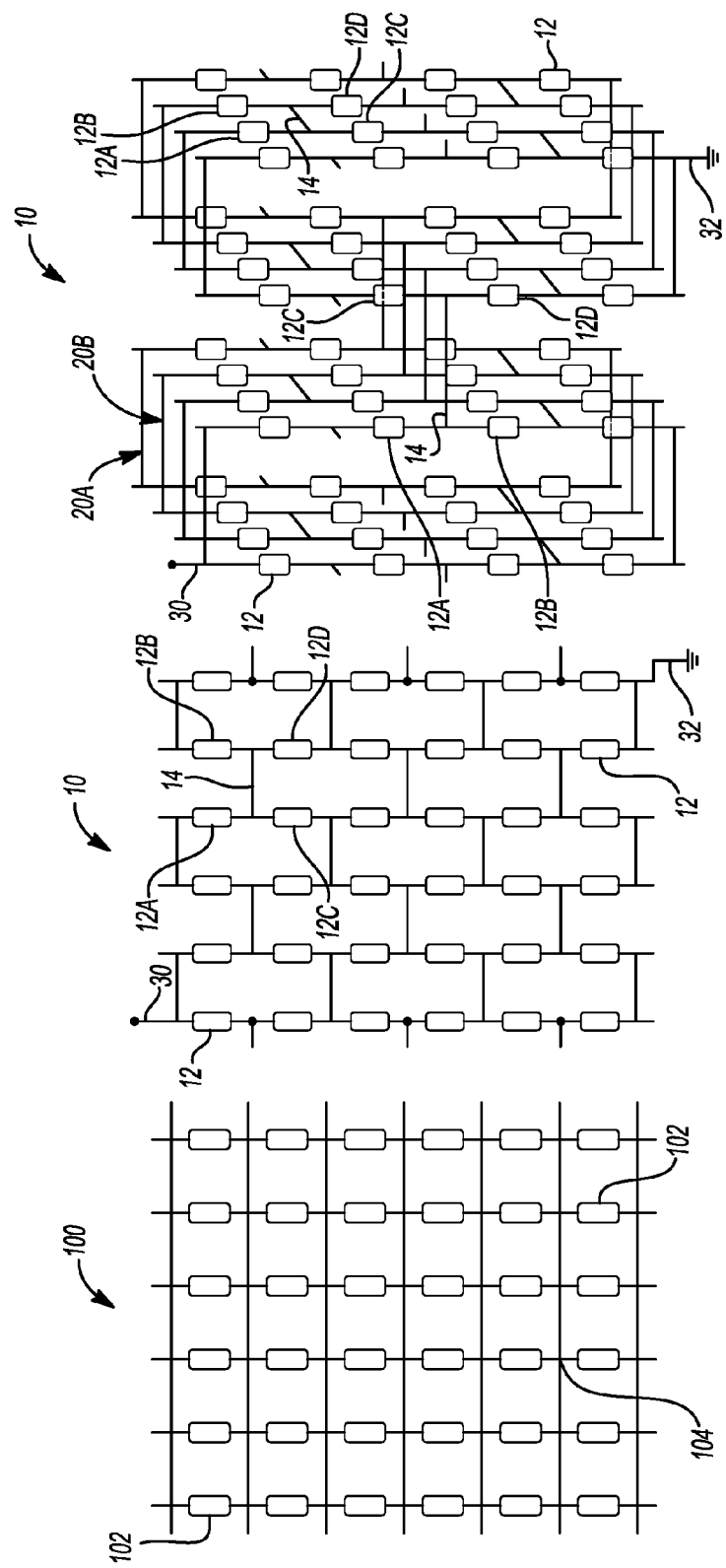

MULTI-DIMENSIONAL BATTERY NETWORKS FOR LARGE SCALE ENERGY STORAGE AND ELECTRICAL VEHICLE APPLICATIONS

CROSS-REFERENCE TO RELATED APPLICATIONS

This application claims the benefit of U.S. Provisional Application No. 61/778,534, filed on Mar. 13, 2013. The entire disclosure of the above application is incorporated herein by reference.

FIELD

The present disclosure relates to multi-dimensional battery network for large scale energy storage applications, such as electric vehicles.

BACKGROUND

This section provides background information related to the present disclosure which is not necessarily prior art.

There is a growing demand for battery-based energy storage technologies. This is especially true in the auto industry wherein electric and hybrid power systems are becoming more common place. Ultimately, the efficiency of an electric or hybrid vehicle is dependent on the efficiency of the power storage mechanism and system employed.

Many electric and hybrid vehicles of today utilize Li ion batteries as their primary energy storage solution. Typically, such vehicles employ a plurality of batteries (also known individually as battery cells) coupled together electrically and sometimes physically as a battery network. Although ideally each battery cell of the battery network is identical, in operation each battery cell often varies in terms of performance and lifespan relative to other battery cells of the battery network. This results in a power imbalance in the battery network and variation in the charging and discharging cycles. Eventually, individual battery cells of the battery network may fail or otherwise be compromised such that the performance of the battery network falters, thereby increasing replacement costs of the battery network and reducing the performance of the electric or hybrid vehicle or associate energy storage systems. This results in a significant barrier for the expansion of electric vehicles to the mass market.

Accordingly, there exists a need in the prior art to enhance the performance of battery assemblies and reduce the negative impact of intrinsic (i.e. capacity, self-discharge, internal equivalent resistances, etc.) and extrinsic (i.e. temperature, mechanical stress, etc.) parameters associated with the failures in individual batteries and reduced battery network performance.

SUMMARY

This section provides a general summary of the disclosure, and is not a comprehensive disclosure of its full scope or all of its features.

According to the principles of the present teachings, a battery network is provided having advantageous construction. In some embodiments, the battery network includes a plurality of four or more individual battery cells each being operable to output stored energy between a network positive terminal and a network ground terminal, and a first node extending between at least some of the plurality of individual battery cells. The first node is electrically coupled to at least and no more than four of the plurality of individual battery cells such that failure of one of the four individual battery cells does not substantially affect operation of the plurality of individual battery cells other than the four individual battery cells. In some embodiments, the plurality of individual battery cells can be arranged in offset levels to define a three-dimensional configuration.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a schematic illustration of a convention battery network according to the prior art;

FIG. 2A is a schematic illustration of a two-dimensional battery network having a plurality of individual battery cells coupled such that four (4) battery cells are electrically coupled at any one node; and FIG. 2B is a schematic illustration of a three-dimensional battery network having a plurality of individual battery cells coupled such that four (4) battery cells are electrically coupled at any one node.

Corresponding reference numerals indicate corresponding parts throughout the several views of the drawings.

DETAILED DESCRIPTION

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

In conventional applications, as illustrated in FIG. 1, battery networks 100 typically comprise a plurality of battery cells 102 being arranged in a plurality of rows and columns. In this arrangement, the plurality of battery cells 102 are electrically coupled in both parallel and series such that at any one node 104 the number of battery cells 102 coupled includes the entirety of adjacent rows. For example, in the configuration of FIG. 1, each node 104 comprises twelve (12) battery cells 102.

In some applications, modules of large scale (N×M) battery network are used where N battery cells are connected in parallel and M of these parallel battery rows are stacked on top of each other. In this standard layout, N and M would determine the current and voltage ratings of the battery network, respectively.

However, if all battery cells used in a standard battery network were identical, the battery cells would participate equally during the charging/discharging cycles of the battery network during operation. Unfortunately, however, there are inevitably battery-to-battery variations among cells and, furthermore, during the lifetime of the battery cell the variations can become significantly enhanced. One well-known source of battery variation arises from the non-uniformities in temperature within the battery network across individual battery cells—for example, the batteries that are close to the center of the battery network operate at higher temperatures due to adjacent batteries and, thus, age at a faster rate. Moreover, there are inevitably battery-to-battery variations arising from intrinsic (i.e. capacity, self-discharge, internal equivalent resistances, etc.) and extrinsic (i.e. temperature, mechanical stress, etc.) parameters that lead to battery variations. Because of this imbalance, electronic battery management systems are often required as an integral part of any battery storage system. Furthermore, during the lifetime of the batteries, the intrinsic cell-to-cell variations can evolve leading to a degradation of the overall performance of the battery cell and failure.

It has been found that failures or degradation of individual battery cells due to non-uniformities in any intrinsic or extrinsic parameters that lead to electrical imbalance among an individual battery cells generally have limited impact beyond the nearest-neighbors of that particular battery—that is, those in physical relation to a particular battery cell and/or those electrically coupled to a common node of the particular battery cell. In some applications the variations between the M stacks are monitored in real time to avoid overcharging of individual rows. However, within each row, since N batteries are connected in parallel, a failure in one of the batteries is expected to directly impact the whole row. Electrically speaking, each battery is in a one-dimensional network, which is intrinsically vulnerable to failures. This creates a serious impediment to scaling these networks to a very large scale where high currents are needed. For large networks, safety issues become a major concern.

Thus, higher-dimensional battery networks are expected to be more uniform and safe relative to failures, such as thermal runaways. It is envisioned that by going to higher dimensional battery networks, the present teachings can enhance the reliability and lifetime of battery networks.

According to the principles of the present teachings, as illustrated in FIG. 2A, a multi-dimensional battery network 10 can comprise a plurality of individual battery cells 12 arranged in a two-dimensional orientation having a series of columns and rows that are electrically coupled to provide output energy or power between a network positive terminal 30 and a network ground terminal 32. Each of the plurality of individual battery cells 12 are electrically coupled to adjacent individual battery cells such that four (4) individual battery cells 12A, 12B, 12C, and 12D are electrically coupled at a single node 14. This pattern of four (4) individual battery cells 12A-12D being electrically coupled at a single node 14 continues throughout battery network 10 irrespective of the overall size or dimensions of battery network 10. In some embodiments, each of the plurality of individual battery cells 12 are Li ion batteries. It should be understood that each battery network 10 may comprise a plurality of nodes 14 depending on the size of battery network 10. It should also be understood that in some embodiments, battery cells 12 can be shared with other nodes 14 so long as any one node contains only a total of four battery cells 12. Additionally, it should be understood that distant nodes 14 may comprise four battery cells 12 that are not shared with another node 14.

In some embodiments, as illustrated in FIG. 2B, battery network 10 can comprise the plurality of individual battery cells 12 arranged in a three-dimensional orientation having a series of columns and rows at a first planar level 20A and a further series of columns and rows at a second planar level 20B. A plurality of planar levels can be employed; however, it should be understood that levels 20 are not required to be planar in orientation. Each of the plurality of individually battery cells 12 of this three-dimensional orientation are electrically coupled to adjacent individual battery cells such that four (4) individual battery cells 12A, 12B, 12C, and 12D are electrically coupled at a single node 14. This pattern of four (4) individual battery cells 12A-12D being electrically coupled at a single node 14 continues throughout battery network 10 irrespective of the overall size or dimensions of battery network 10 and irrespective of the overall number of levels. It should be noted that the four-cell-per-node configuration holds true even across multiple levels 20. It should be understood that this pattern of four (4) individual battery cells 12A-12D per node 14 can extend across levels 20 such that at least some of the four individual battery cells 12A-12D can reside on first level 20A and others of the four individual battery cells 12A-12D can reside on second level 20B as illustrated in FIG. 2B.

Accordingly, multi-dimensional battery network 10 provides arrangements wherein only four (4) individual battery cells 12 are connected to each node 14, such that a problem in a single battery cell 12 has a limited impact on the battery network 10 because such impact of a problematic cell typically only extends to its neighbor. This resilience to network failure of higher dimensional battery networks can be illustrated by a simple, but highly extreme, situation of shorting an individual battery cell. The power dissipation associated with this failure in a battery network consisting of N×M cells connected in a standard network is represented by:

$$P=(N-1)V^2/R_{int}$$

where V and $R_{int}$ are the open circuit voltage and internal resistance of the cell, respectively. On the other hand, the power dissipation associated with this failure in a higher-dimensional network is $$P=V^2/R_{int}$$

which is smaller than that of the standard battery network by a factor of (N−1).

This is a transformative architecture leading to a robust battery network technology directly relevant to EV storage applications. The present teachings can reduce the overall cost of the battery network by reducing the complexity of thermal and energy management systems and by increasing the battery network storage density by allowing the use of higher specific energy cells.

It is envisioned that the two-dimensional network can also be used in photovoltaic applications where large number of cells are needed to be connected to each other.

While reference has been made to batteries, it is readily understood that the concepts described herein are extendable to other types of energy storage devices.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A multi-dimensional battery network comprising:
a plurality of individual battery cells being electrically connected in a three-dimensional periodic network, the plurality of individual battery cells being electrically arranged in at least first through fourth rows, first through fourth columns, and first through fourth planar levels such that:
the first through fourth battery cells in every column are electrically coupled in series resulting in first, second, and third nodes therebetween;
the third and fourth battery cells of every column on the first planar level are electrically coupled at the third node to the third and fourth battery cells of the corresponding column on the second planar level, the first and second battery cells of every column on the second planar level are electrically coupled at the first node to the first and second battery cells of the corresponding column on the third planar level, the third and fourth battery cells of every column on the third planar level are electrically coupled at the third node to the third and fourth battery cells of the corresponding column on the fourth planar level,
the second and third battery cells of the second column on every planar level are electrically coupled at the second node to the second and third battery cells of the third column of the corresponding planar level, and
each of said plurality of individual battery cells being operable to output stored energy between a network positive terminal and a network ground terminal.

2. The multi-dimensional battery network according to claim 1 wherein said plurality of individual battery cells are each Li ion battery cells.

3. The multi-dimensional battery network according to claim 1
wherein each of the nodes electrically couples at least and no more than four of said plurality of individual battery cells such that failure of one of said four individual battery cells does not substantially affect operation of said plurality of individual battery cells other than said four individual battery cells.

4. A battery network comprising:
a plurality of individual battery cells each being operable to output stored energy between a network positive terminal and a network ground terminal, the plurality of individual battery cells being electrically arranged in a two-dimensional periodic network in at least first through three rows and first through fourth columns such that:
the first through three battery cells in every column are electrically coupled in series resulting in first and second nodes therebetween; and
the second and third battery cells of the first column are electrically coupled at the second node to the second and third battery cells of the second column, the first and second battery cells of the second column are electrically coupled at the first node to the first and second battery cells of the third column, the second and third battery cells of the third column are electrically coupled at the second node to the second and third battery cells of the fourth column.

5. The battery network according to claim 4 wherein said plurality of individual battery cells are each Li ion battery cells.

6. The battery network according to claim 4
wherein each of the nodes electrically couples at least and no more than four of said plurality of individual battery cells such that failure of one of said four individual battery cells does not substantially affect operation of said plurality of individual battery cells other than said four individual battery cells.

* * * * *